(12) United States Patent
Shoji et al.

(10) Patent No.: US 7,754,069 B2
(45) Date of Patent: Jul. 13, 2010

(54) FILTER FOR TRAPPING FOREIGN MATTER

(75) Inventors: Yukio Shoji, Oyama (JP); Nobumi Yoshida, Tochigi-ken (JP)

(73) Assignee: Komatsu Ltd., Tokyo (JP)

( * ) Notice: Subject to any disclaimer, the term of this patent is extended or adjusted under 35 U.S.C. 154(b) by 393 days.

(21) Appl. No.: 10/802,027

(22) Filed: Mar. 17, 2004

(65) Prior Publication Data

US 2004/0226868 A1 Nov. 18, 2004

(30) Foreign Application Priority Data

Mar. 26, 2003 (JP) ............................. 2003-086315

(51) Int. Cl.
*B01D 35/30* (2006.01)
(52) U.S. Cl. .............................. 210/90; 55/434; 55/462; 210/443; 210/456; 210/497.01
(58) Field of Classification Search .................. 210/90, 210/310, 311, 440, 443, 456, 337, 338, 497.01; 55/315, 318, 320–323, 331, 434, 462–465, 55/482–489; 96/421

See application file for complete search history.

(56) References Cited

U.S. PATENT DOCUMENTS

| 1,197,634 | A | * | 9/1916 | Hull ............................ 210/305 |
| 1,922,688 | A | * | 8/1933 | Kamrath ....................... 55/330 |
| 2,171,752 | A | * | 9/1939 | Kamrath ....................... 96/335 |
| 2,655,894 | A | * | 10/1953 | Rabbitt ........................ 116/270 |
| 2,733,775 | A | * | 2/1956 | Dupure ........................ 210/348 |
| 3,070,232 | A | * | 12/1962 | Casaleggi ..................... 210/90 |
| 3,675,776 | A | * | 7/1972 | Campo ........................ 210/232 |
| 4,014,671 | A | | 3/1977 | Andro et al. ................. 55/325 |
| 4,250,037 | A | | 2/1981 | Kempa ........................ 210/310 |
| 4,681,677 | A | * | 7/1987 | Kuh et al. .................... 210/88 |
| 4,687,572 | A | * | 8/1987 | Budzich ....................... 210/114 |

(Continued)

FOREIGN PATENT DOCUMENTS

DE   25 26 989 A1   1/1976

(Continued)

*Primary Examiner*—Joseph W Drodge
(74) *Attorney, Agent, or Firm*—Kratz, Quintos & Hanson, LLP (57) ABSTRACT

It is an object of the present invention to provide a filter for trapping foreign matter in which a filtration element can trap foreign matter that is admixed to a fluid present inside the filter with good reliability and a comparatively high trapping ratio. Hydraulic oil that has flown from an opening portion into a guide space of a first flow path guide is guided downward by the first flow path guide and directed toward a second flow path guide. As a result, the oil passes through a very narrow gap, that is, a gap with a cross sectional area of the flow path narrowed so as to increase the flow velocity of the hydraulic oil, a rising flow of the hydraulic oil is formed, and this flow is spouted up by the second flow path guide and guided by the first flow path guide toward a filter element. Foreign matter admixed to the hydraulic oil rises with good intensity together with the hydraulic oil and is moved by the hydraulic oil toward the filter element. Therefore, foreign matter can be trapped by the filter element with good reliability and a comparative high trapping ratio.

9 Claims, 5 Drawing Sheets

INFLOW CHAMBER 3a, 5a
OUTFLOW CHAMBER 11c
FILTER ELEMENT 3
STRUCTURE 5,7 CREATING RISING FLOW OF FLUID

U.S. PATENT DOCUMENTS

| | | | |
|---|---|---|---|
| 4,904,384 A | | 2/1990 | Pötz .......................... 210/309 |
| 5,271,850 A | * | 12/1993 | Stutzman .................... 210/767 |
| 5,535,588 A | | 7/1996 | Peterson et al. ............... 60/454 |
| 5,569,373 A | * | 10/1996 | Smith et al. ................... 210/90 |
| 6,013,178 A | * | 1/2000 | Strano et al. ................ 210/136 |

FOREIGN PATENT DOCUMENTS

| | | |
|---|---|---|
| DE | 90 10 853 U1 | 7/1990 |
| DE | 195 16 657 A1 | 11/1995 |
| DE | 101 62 575 A1 | 7/2002 |
| GB | 2 088 235 A | 6/1982 |
| JP | 57-173808 | 11/1982 |
| JP | 63-171612 | 7/1988 |
| JP | 04-134409 | 12/1992 |
| JP | 08-108019 | 4/1996 |
| JP | 9-192419 | 7/1997 |
| JP | 10-258221 | 9/1998 |
| JP | 2000-502606 | 3/2000 |
| WO | WO 97/24169 | 7/1997 |

* cited by examiner

FIG. 1

INFLOW CHAMBER 3a, 5a
OUTFLOW CHAMBER 11c
FILTER ELEMENT 3
STRUCTURE 5,7 CREATING RISING FLOW OF FLUID

FILTER FOR TRAPPING FOREIGN MATTER

CROSS-REFERENCE TO PRIOR APPLICATION

This application relates to and claims priority from Japanese Patent Application Nos. 2003-086315, filed on Mar. 26, 2003 the entire disclosure of which are incorporated herein by reference.

BACKGROUND OF THE INVENTION

1. Field of the Invention

The present invention relates to a filter for trapping foreign matter, comprising an inflow chamber into which a fluid flows, an outflow chamber from which flows the fluid that has flown into the inflow chamber, and a filter element partitioning the two chambers.

2. Description of the Related Art

If impurities (foreign matter) such as dirt, carbon powder, metal powder (iron powder) are admixed to a hydraulic oil (working oil) in hydraulic apparatuses (hydraulic equipment), then sliding portions of hydraulic pumps, hydraulic motors, and hydraulic cylinders, that is, contact zones of movable mechanisms and fixed mechanisms in those components are subjected to wear, or movement of the movable mechanisms is inhibited. If a hydraulic apparatus is continuously used in such a state, the operation efficiency of the hydraulic apparatus is decreased and the quantity of the foreign matter in the hydraulic apparatus increases with the extension of the use interval of the hydraulic apparatus, eventually damaging the apparatus such as the hydraulic pump.

Accordingly, a variety of suggestions have been made with the object of improving the technology of removing (filtering) foreign matter from the hydraulic oil in the filters that together with aforementioned hydraulic pumps or the like constitute hydraulic apparatuses. According to one of the suggestions, there is provided a configuration (filter element and filtration apparatus) in which a spacer is provided between the opposing filters, the deformation of the filter by the pressure acting upon the filter surface during backwashing is prevented, the impurities that were deposited on the opposing filter surfaces are prevented from coming into contact with each other, a flow path for the fluid containing the impurities that were separated by backwashing is maintained, and the impurities that were separated from the filter can be easily discarded (for example, see Japanese Patent Application Laid-open No. H10-258221).

Because a constant relationship exists between the quantity of foreign matter that is admixed to a hydraulic oil and the degree of wear and damage of the hydraulic pump or hydraulic motor, if the quantity of foreign matter can be assessed, then the degree of wear and damage of the hydraulic pump or the like can be established. The quantity of foreign matter can be assessed by measuring the differential pressure (pressure loss) in the filter element generated owing to the entrapment of the foreign matter by the filtration element.

The above-described conventional technology was suggested with the object of increasing the cost efficiency by extending the interval representing the service live of the filter element and also increasing the cost efficiency by reducing the number of filter elements in a single filtration apparatus by using filter elements with high capacity of trapping foreign matter. This technology involved the so-called surface filtration by which the hydraulic oil is filtered by trapping foreign matter with the surface of the filter element and was not, in the first place, suggested with the object of trapping foreign matter admixed to hydraulic oil. For this reason, in the aforementioned conventional technology, the filtration apparatuses are not constructed for reliably trapping foreign matter that flows together with hydraulic oil into the filtration apparatus, and the foreign matter that was rejected by the filtration element and was not trapped accumulates on the bottom of the filtration apparatus.

Accordingly, the problem associated with the filtration apparatuses of the conventional technology was that even if the differential pressure in the filter element that is caused by the entrapment of foreign matter in the filter element was measured, the quantity of the foreign matter that has been admixed to hydraulic oil could not be assessed accurately. As a result, the damage of hydraulic pumps or the like was difficult to prevent in advance by implementing the necessary maintenance before the wear or damage state of the hydraulic pump or the like becomes severe.

SUMMARY OF THE INVENTION

Accordingly, it is a first object of the present invention to provide a filter for trapping foreign matter in which a filter element can trap the foreign matter which is admixed to the fluid inside the filter with good reliability and a comparatively high trapping ratio.

Further, it is a second object of the present invention to provide a filter for trapping foreign matter in which the foreign matter that was admixed to the fluid present in the filter and once trapped by the filter element can be prevented from being separated from the filter element.

Further, it is a third object of the present invention to provide a filter for trapping foreign matter in which the quantity of foreign matter can be detected with good accuracy by measuring the pressure loss in the filter element by providing a configuration such that the filter element can trap the foreign matter which is admixed to the fluid inside the filter with good reliability and a comparatively high trapping ratio.

Further, it is a fourth object of the present invention to provide a filter for trapping foreign matter in which even if part of the foreign matter that is admixed to the fluid inside the filter is rejected by the filter element, this rejected foreign matter can be again trapped by the filter element, rather than being accumulated on the bottom of the filter.

Moreover, it is a fifth object of the present invention to provide a filter for trapping foreign matter in which the size of the foreign matter which is the object of trapping with the filter element, of the foreign matter that is admixed to the fluid present in the filter, can be set to a desired value.

The filter for trapping foreign matter according to the first aspect of the present invention comprises an inflow chamber (3a, 5a) into which a fluid flows, an outflow chamber (11c) from which flows the fluid that has flown into the inflow chamber (3a, 5a), and a filter element (3) partitioning said two chambers, wherein the inflow chamber (3a, 5a) has a structure (5, 7) such that the fluid that flows into the inflow chamber (3a, 5a) is spouted up from the bottom portion of the inflow chamber (3a, 5a) and produces a rising flow of the fluid such that is directed toward the filter element (3).

With such a configuration, the fluid that flows into the inflow chamber (3a, 5a) is spouted up from the bottom portion of the inflow chamber (3a, 5a) and produces a rising flow of the fluid such that is directed toward the filter element (3). Therefore, the foreign matter admixed to the fluid also rises together with the fluid and is moved by the fluid toward the filter element (3). As a result, the foreign matter can be trapped by the filter element (3) with good reliability and a comparatively high trapping ratio.

In the preferred embodiment relating to the first aspect of the present invention, the inflow chamber (3a, 5a) has an inlet (13i) in the upper part thereof and comprises a guide (5) that guides the fluid that flows in from the inlet (13i) toward the lower part of the inflow chamber (3a, 5a), directs it toward the bottom portion (7) of the inflow chamber (3a, 5a), causes it to rise from the bottom portion (7), and guides it so that it falls upon the filter element (3).

With such a configuration, the fluid that flows from the inlet (13i) into the inflow chamber (3a, 5a) is guided by the guide (5) toward the lower part of the inflow chamber (3a, 5a), directed toward the bottom portion (7) of the inflow chamber (3a, 5a), is caused to rise from the bottom portion (7), and is guided toward the filter element (3). Therefore, the filter element (3) can trap the foreign matter with good reliability and a comparatively high trapping ratio. Further, even if there is the foreign matter that is rejected by the filter element (3), this rejected foreign matter is again directed toward the filter element (3), rather than being accumulated on the bottom portion (7) of the filter. Therefore, there is a very high probability that it will be trapped by the filter element (3).

In another embodiment, the cross section area of a flow path between the guide (5) and the bottom surface of the inflow chamber (3a, 5a) is narrowed so as to increase the flow velocity of the fluid.

With such a configuration, the flow velocity of the fluid is increased when it flows between the guide (5) and the bottom surface of the inflow chamber (3a, 5a) where the cross section area of the flow path is narrowed. Therefore, trapping can be conducted by the filter element (3) with a comparatively high trapping ratio.

In yet another embodiment, the inflow chamber (27a) has an inlet (25a) in the bottom portion thereof and the flow of the fluid that has flown from the inlet (25a) into the inflow chamber (27a) rises from the bottom portion.

With such a configuration, the flow of the fluid that has flown from the inlet (25a) into the inflow chamber (27a) rises from the bottom portion of the inflow chamber (27a). Therefore, similarly to the above-described configurations, the filter element (27) can conduct trapping with good reliability and a comparatively high trapping ratio.

In still another embodiment, the inflow chamber (27a) has a guide (29) that forcibly guides to the filter element (27) the rising flow of the fluid that has flown from the inlet (25a) of the bottom portion into the inflow chamber (27a).

With such a configuration, the rising flow of the fluid that has flown from the inlet (25a) of the bottom portion into the inflow chamber is forcibly guided by the guide (29) toward the filter element (27). Therefore, similarly to the above-described configurations, the filter element (27) can conduct trapping with good reliability and a comparatively high trapping ratio.

In yet another embodiment, the inflow chamber (3a, 5a) has a streamline shape (7) preventing the stagnation of the fluid.

With such a configuration, because the stagnation of the flow inside the inflow chamber (3a, 5a) is prevented, the accumulation of foreign matter that was admixed to the fluid is also prevented.

The filter for trapping foreign matter according to the second aspect of the present invention comprises an inflow chamber (3a) into which a fluid flows, an outflow chamber (11c) from which flows the fluid that has flown into the inflow chamber 3a, and a filter element (3) partitioning the two chambers, wherein a guide (33) for forcibly guiding the flow of the fluid that has flown into the inflow chamber (3a) toward the filter element (3) is held inside the inflow chamber (3a).

With such a configuration, the flow of the fluid that has flown into the inflow chamber (3a) is forcibly guided by the guide (33) toward the filter element (3). Therefore, similarly to the above-described configurations, the filter element (3) can conduct trapping with good reliability and a comparatively high trapping ratio.

The filter for trapping foreign matter according to the third aspect of the present invention comprises an inflow chamber (11c or 31c) into which a fluid flows, an outflow chamber (31c or 11c) from which flows the fluid that has flown into the inflow chamber (11c or 31c), and a filter element (31) partitioning the two chambers, wherein the filter element (31) comprises a target trapping element (31a) for trapping the foreign matter which is the target, and a fall-off preventing element (31b) for preventing the foreign matter which is the target trapped by the target trapping element (31a) from falling off, the fall-off preventing element being provided on the side surface of the inflow path of the target trapping element (31a).

With such a configuration, the foreign matter which is the target is trapped with the target trapping element (31a), and the foreign matter that has been trapped with the target trapping element (31a) is prevented from falling off with the fall-off preventing element (31b). Furthermore, the foreign matter of the desired size can be trapped as the target by changing the target trapping element (31a) to the element corresponding to the size of the foreign matter which is the object of trapping.

In the preferred embodiments relating to the first, second, and third aspects of the present invention, there is additionally provided a differential pressure sensor (9) for detecting the difference in pressure between the inflow chamber (3a, 5a, 11c, or 31c) and the outflow chamber (31c or 11c) in the filter element (3, 27, 31).

With such a configuration, measuring the pressure loss in the filter element (3, 27, 31) with the differential pressure sensor (9) makes it possible to detect the quantity of foreign matter admixed to hydraulic oil with good accuracy.

DESCRIPTION OF THE PREFERRED EMBODIMENTS

The preferred embodiments of the present invention will be described below with reference to the drawings.

Figure 1:
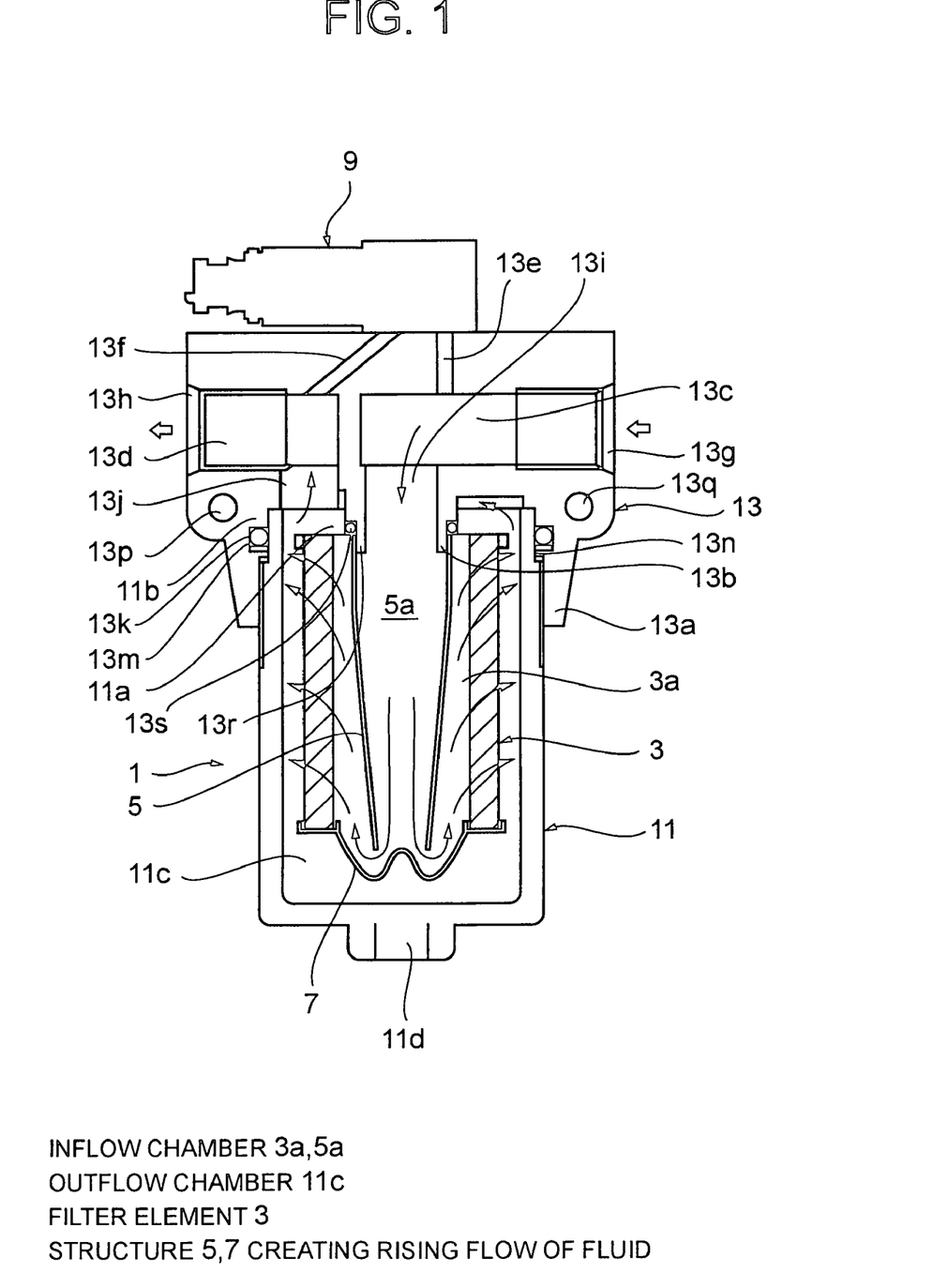
FIG. 1 is an explanatory drawing illustrating the entire cross-sectional structure of the filter for trapping foreign matter of the first embodiment of the present invention.

FIG. 1 is an explanatory drawing illustrating the entire cross-sectional structure of the filter for trapping foreign matter of the first embodiment of the present invention.

The filter for trapping foreign matter, as shown in FIG. 1, comprises a housing 1, a filter element 3 disposed inside the housing 1, a first flow path guide 5 disposed inside the filter element 3, a second flow path guide 7 disposed inside the housing 1, and a differential pressure sensor 9 mounted and fixed above the housing 1 as the main constituent elements.

The housing 1 as a whole has, for example, an almost cylindrical shape and is composed of a housing body 11 extending in the up-down direction (longitudinal direction), as shown in FIG. 1, and a hydraulic oil inflow/outflow unit 13 mounted and fixed above the housing body 11, formed so as to maintain an almost round contour as a whole, and also formed so that the cross section thereof assumes an almost pleat shape.

In the housing body 11, as shown in FIG. 1, the entire surface of the upper portion thereof serves as an opening portion 11a, and the upper edge portion of the housing body 11, which surrounds the opening portion 11a, and the zone close thereto form a step 11b formed to have a small thickness over the entire perimeter thereof. On the other hand, in the bottom surface of the housing body 11, an almost round drain 11d linked to an internal space 11c bounded by the housing body 11 is formed almost concentrically so as to protrude downward.

The hydraulic oil inflow/outflow unit 13 comprises an outer protruding portion 13a, an inner protruding portion 13b, a hydraulic oil inflow path 13c, a hydraulic oil outflow path 13d, a hydraulic detection channel 13e, a hydraulic detection channel 13f, a hydraulic oil inflow orifice 13g, a hydraulic oil outflow orifice 13h, and opening portions 13i, 13j.

The outer protruding portion 13a protrudes downward, as shown in FIG. 1, and is formed to have a round ring-like shape for mounting and fixing the hydraulic oil inflow/outflow unit 13 on the housing body 11 by fitting the upper edge portion of the housing body 11 having an almost cylindrical shape on the inner peripheral side of the outer protruding portion 13a and mating with the outer protruding portion 13a. Further, a notch groove 13k is formed along the entire perimeter in the appropriate location on the inner peripheral surface of the outer protruding portion 13a and an O ring 13m is placed into the notch groove 13k, and a step-like portion 13n having a small thickness on the downward side thereof is formed so as to enable the engagement with the step-like portion 11b of the housing body 11 when the housing body 11 is fitted in the outer protruding portion 13a in the above-described mode.

The inner protruding portion 13b protrudes downward, similarly to the outer protruding portion 13a, and is formed to have a round-ring-like shape almost concentric with the outer protruding portion 13a. An opening portion 13i is formed on the inner peripheral side of the inner protruding portion. A step-like portion 13r with a small thickness on the downward side thereof is formed on the outer peripheral side of the inner protruding portion 13b. The hydraulic oil inflow path 13c extends in the horizontal direction, as shown in FIG. 1, one end thereof is linked to the hydraulic oil inflow orifice 13g, and the other end thereof is bent at an almost right angle and linked to the opening portion 13i. The hydraulic oil outflow path 13d also extends in the horizontal direction, as shown in FIG. 1, but in the direction opposite to that of the hydraulic oil inflow orifice 13g. One end of the hydraulic oil outflow path is linked to the hydraulic oil outflow orifice 13h, and the other end thereof is bent at an almost right angle and linked to the opening portion 13j formed adjacently to the outer peripheral side of the inner protruding portion 13b.

In the hydraulic detection channel 13e, one end is linked to the hydraulic oil inflow path 13c and the other end is linked to the differential pressure sensor 9 provided above the hydraulic oil inflow/outflow unit 13, so that the pressure on the side of the hydraulic oil inflow path 13c is transmitted to the differential pressure sensor 9. On the other hand, in the hydraulic detection channel 13f, one end is linked to the hydraulic oil outflow path 13d and the other end is linked to the differential pressure sensor 9, so that the pressure on the side of the hydraulic oil outflow path 13d be transmitted to the differential pressure sensor 9.

The housing body 11, in the above-described mode, is fixed by joining the inner side of the outer protruding portion 13a and housing 11 with bolts. As a result, as shown in FIG. 1, the opening portion 13i is positioned almost in the center of the inner space 11c of the housing body 11 and linked in this position to the inner space 11c, and the opening portion 13j is linked to the inner space 11c in a position adjacent to the outer peripheral side of the opening portion 13i.

The entire filter element 3 with an almost cylindrical shape has a mesh formed over almost the entire periphery thereof to trap foreign matter such as metal powder (iron powder) or metal chips admixed to the hydraulic oil. A round space portion 3a is formed almost concentrically in the filter element, and both the upper end portion and the lower end portion thereof become the opening portions of the same size as the round space portion 3a and linked to the round space portion 3a. The filter element is disposed almost concentrically inside the inner space 11c in a state of dangling from the inner protruding portion 13b by inserting the upper end portion of the filter element into the step-like portion 13r of the inner protruding portion 13b via an O ring 13s. Employing a filter element having a mesh size suitable for trapping the desired foreign matter (of the desired size) as the filter element 3 makes it possible to change easily the foreign matter (size thereof) which is the target of trapping with the filter element 3.

The first flow path guide 5, as shown in FIG. 1 is a member extending in the up-down direction (longitudinal direction), as shown in FIG. 1, has as a whole an almost cylindrical shape, and is tapered so that the lower end portion thereof has a smallest diameter, the upper end portion thereof and the zone close thereto have the largest diameter, and the diameter gradually increases from the lower end portion to the upper end portion. The first flow path guide 5 is disposed almost concentrically inside the round space portion 3a of the filter element 3 in a state of dangling from the inner protruding portion 13b by inserting the upper end portion of the first flow path guide together with the upper end portion of the filter element 3 into the step-like portion 13r of the inner protruding portion 13b via the O ring 13s.

The second flow path guide 7, for example, has a round contour, as shown in FIG. 1, and is gradually (smoothly) curved so that the cross section thereof assumes an almost W-like shape. The outer edge portion thereof assuming a round shape is fitted on the inner peripheral side of the lower edge portion of the filter element 3 in a state such that the opening portion at the lower end side of the filter element 3 is almost completely sealed and so that a very small gap is formed between it and the lower end portion of the first flow path guide 5.

With the hydraulic of the above-described configuration, because the diameter of the first flow path guide 5 decreases in a taper-like fashion from the position close to the upper end portion to the lower end portion thereof, the hydraulic oil flowing from the hydraulic oil inflow orifice 13g into the guide space 5a formed by the first flow path guide 5 via the hydraulic oil inflow path 13c and opening portion 13i is effectively guided by the guide space 5a toward the second flow path guide 7. Because the opening portion 13i is sealed with the O ring 13s, the hydraulic oil which tries to flow from the opening 13i into the guide space 5a of the first flow path guide 5 is prevented from inappropriately flowing to the outside of the guide space 5a (in other words, into a narrow small space bounded by the outer peripheral surface of the first flow path guide 5 and the inner peripheral surface of the filter element 3 in the round space portion 3a, or into a narrow small portion of the inner space 11c bounded by the filter element 3 and the inner peripheral surface of the housing body 11).

The hydraulic oil that was thus effectively guided by the first flow path guide 5 toward the second flow path guide 7 passes through the above-described very narrow gap between the lower end portion of the first flow path guide 5 and the part of the second flow path guide 7 that was curved upward, this part being positioned in the lower end portion of the filter element 3 and, therefore, serving as the bottom portion of the filter element 3. Having passed through this gap the oil falls with high intensity on the part of the second flow path guide 7 that was bent downward and is bounced back by this part. As a result, the oil is spouted up from this curved portion and the flow of the hydraulic oil that was heretofore a downward flow changes its direction so that the oil flows upward. The flow of hydraulic oil that has changed its direction so that the oil flows upward passes through a narrow small space bounded by the outer peripheral surface of the first flow path guide 5 and the inner peripheral surface of the filter element 3 in the round space portion 3a and is directed toward the filter element 3. Under the effect of this upward flow of hydraulic oil, foreign matter admixed to the hydraulic oil is whirled up in the direction of the filter element 3 and is trapped by the filter element 3.

As described hereinabove, with the first embodiment of the present invention, the hydraulic oil flowing from the opening portion 13i positioned above the housing body 11 into the guide space 5a of the first flow path guide 5 is directed downward by the first flow path guide 5 and falls upon the second flow path guide 7. As a result, it passes through a very narrow gap (that is, the gap that was narrowed so that the cross sectional area of the flow path increases the flow speed of the hydraulic oil) and generates a rising flow (of hydraulic oil) that is spouted up from the second flow path guide 7, and this flow is then guided by the first flow path guide 5 toward the filter element 3. As a result, the foreign matter admixed to the hydraulic oil is raised with good intensity together with the hydraulic oil and transported by the hydraulic oil toward the filter element 3. As a result, the foreign matter is trapped rather reliably and with a comparatively high trapping ratio by the mesh of the filter element 3.

Further, even if there is foreign matter repulsed by the filter element 3, this repulsed foreign matter is not accumulated on the bottom (that is, the second flow path guide 7 in the present modification) of the filter and sent to the filter element 3 again by the above-described rising flow of the hydraulic oil. Therefore, the probability of the foreign matter being trapped by the filter element 3 is very high. Furthermore, because the probability of the foreign matter being trapped by the filter element 3 is very high, this trapping of the foreign matter with the filter element 3 can be reflected in the difference in pressure between the hydraulic oil inflow path 13c and hydraulic oil outflow path 13d generated on both sides of the filter element 3. Therefore, by measuring the difference in pressure between the hydraulic oil inflow path 13c and hydraulic oil outflow path 13d with the differential pressure sensor 9, it is possible to determine with a rather good accuracy the quantity of foreign matter admixed to the hydraulic oil. Therefore, the necessary maintenance of the components of hydraulic apparatuses such as hydraulic pumps (not shown in the figure) or hydraulic motors (not shown in the figure) can be conducted.

In the filter for trapping foreign matter of the above-described configuration, using a filter element having a mesh size suitable for trapping the desired foreign matter (of the desired size) as the filter element 3 makes it possible to change easily the foreign matter (size of the foreign matter) which is the target of trapping with the filter element 3.

Figure 2:
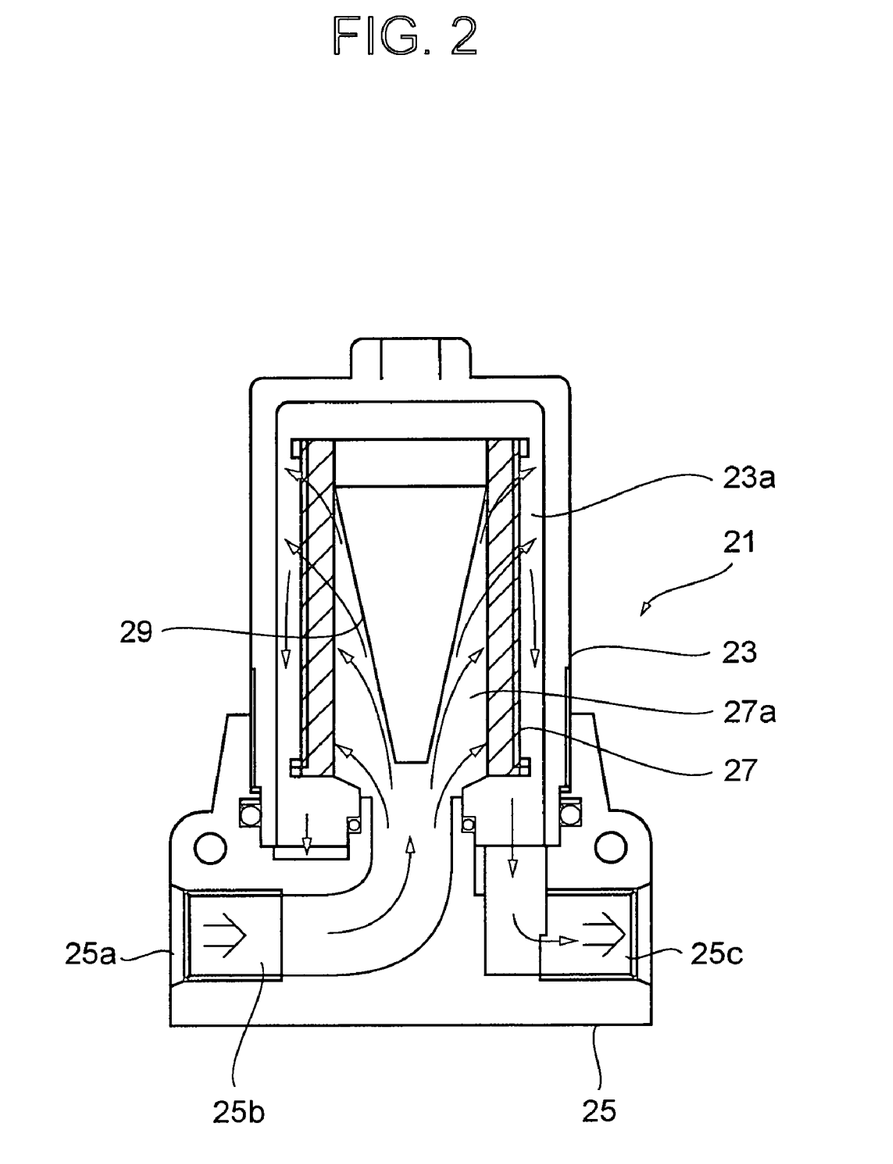
FIG. 2 is an explanatory drawing illustrating the entire cross-sectional structure of the filter for trapping foreign matter of the second embodiment of the present invention.

FIG. 2 is an explanatory drawing illustrating the cross section of the entire structure of the filter for trapping foreign matter of the second embodiment of the present invention.

A specific feature of the filter for trapping foreign matter of the present embodiment is that it has the so-called reverse flow structure in which, as shown in FIG. 2, the housing 21 has a configuration such that the hydraulic oil inflow/outflow portion 25 is mounted below the housing body 23, and the inflow of the hydraulic oil into the inner space 23a of the housing body 23 and the outflow of the oil from the inner space 23a are conducted through the hydraulic oil inflow/outflow portion 25 positioned in the bottom portion of the housing 21.

Thus, in the filter for trapping foreign matter shown in FIG. 2, the flow of the hydraulic oil that has flown from the hydraulic oil inflow orifice 25a into the hydraulic oil inflow path 25b is converted into a rising flow advancing from the horizontal direction (lateral direction) in FIG. 2 to a vertical direction (longitudinal direction) in FIG. 2 by the hydraulic oil inflow path 25b, which is provided with the curved portion, and is whirled up. The part where the direction of the flow path is bent from the lateral direction of the hydraulic oil inflow path 25b to the longitudinal direction is provided with a smooth curved shape (streamlined), as described hereinabove, because if the bent part is sharp, there is a risk of the hydraulic oil flow stagnating in this part.

If the rising flow of the hydraulic oil that was thus intensified flows from the hydraulic oil inflow/outflow portion 25 positioned in the bottom of the housing 21 into the inner space 23a of the housing body 23 positioned above the hydraulic oil inflow/outflow portion, the flow will be guided toward the filter element 27 with a third flow path guide 29 having a cone-like cross section and dangling inside the round space portion 27a of the filter element 27 in a state in which the base portion thereof is inserted into the upper end portion of the filter element 27 and parts in the vicinity thereof.

As a result, the foreign matter admixed to the hydraulic oil also rises with good intensity together with the hydraulic oil and is transported by the hydraulic oil toward the filter element 27. Therefore, the foreign matter is trapped rather reliably and with a comparatively high trapping ratio by the mesh of the filter element 27.

Even if there is foreign matter that was not trapped by the filter element 27 and fell to the bottom, that is, to the curved part of the hydraulic oil inflow path 25b, it is again spouted up to the filter element 27 by the rising flow of the hydraulic oil that flows from behind into the hydraulic oil inflow path 25b. Therefore, any foreign matter is trapped by the filter element 27 with an efficiency of almost 100%.

A method comprising cutting a thread on the outer peripheral surface of the fourth flow path guide 33 apparently can be used as means for generating a rotating flow of the hydraulic oil, such that rotates from the inside to the outside (toward the filter element 3) inside the inner space 11c. The effect demonstrated with such a configuration can be almost identical to that obtained in the present embodiment.

Further, the differential pressure sensor denoted by a reference numeral 9 in FIG. 1 is nowhere shown in FIG. 2, but it is preferably disposed in an appropriate location above the housing 21 or in an appropriate location on the side surface of the housing 21. It is undesirable that the bottom portion of the housing 21, that is, the hydraulic oil inflow/outflow unit 25 be selected as the location of the sensor because foreign matter such as dirt can be easily accumulated therein.

The reference symbol 25c denotes a hydraulic oil outflow path constituting together with the hydraulic oil inflow path 25b the hydraulic oil inflow/outflow unit 25. Specifics relating to the configuration of other components constituting the housing body 21 and hydraulic oil inflow/outflow unit 25 are almost identical to those described with reference to FIG. 1. Therefore, explanation of the reference symbols assigned to those components is omitted.

Figure 3:
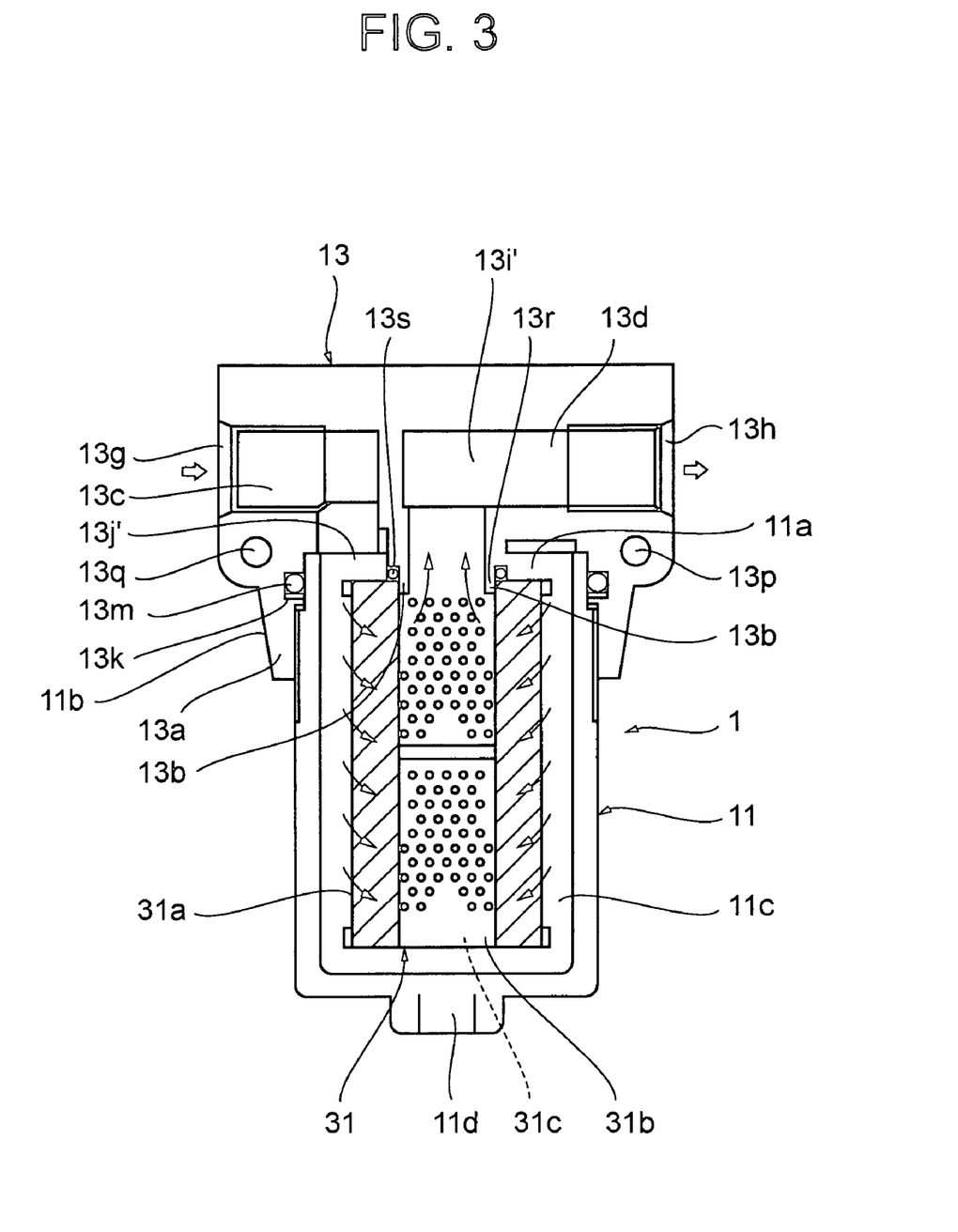
FIG. 3 is an explanatory drawing illustrating the entire cross-sectional structure of the filter for trapping foreign matter of the third embodiment of the present invention.

FIG. 3 is an explanatory drawing illustrating the entire cross sectional structure of the filter for trapping foreign matter of the third embodiment of the present invention.

The main specific feature of the filter for trapping foreign matter of the present embodiment is that a filter element of a two-layer system is used as the filter element 31, this filter element being composed of a first-stage filter element 31a positioned on the outside so as to face the inner space 11c bounded by the housing body 11 and the second-stage filter element 31b positioned inside the first-stage filter element. Other constituent features are identical to those illustrated by FIG. 1. Therefore, in FIG. 3, the components identical to those shown in FIG. 1 are assigned with the same reference symbols and the explanation thereof is omitted.

The filter element 31 will be further described below. The first-stage filter element 31a holds a mesh of a (coarse) size slightly larger than that of the foreign matter with the size which is the object of trapping (target size), that is, the mesh such that foreign matter of the target size is suspended therein, but eventually passes therethrough. On the other hand, the second-stage filter element 31b holds a (fine) mesh such that the foreign matter (of the aforementioned target size) that has passed through the first-stage filter element 31a does not passes therethrough (is trapped) and remains therein. The filter element 31 has a round space portion 31c, similarly to the above-described filter elements 3 and 27.

With the above-described configuration, the foreign matter of the target size is first temporarily suspended in the first-stage filter element 31a which is the filter element of the front stage, and then this suspended foreign matter is trapped by the second-stage filter element 31b which is the main filter element. Therefore, not only the foreign matter that was trapped by the filter element 31 is prevented from separating from the filter element 31, but also trapping of the foreign matter with the filter element 31 can be reflected in the difference in pressure between the hydraulic oil inflow path 13c and hydraulic oil outflow path 13d generated on both sides of the filter element 31.

When the direction of oil flow is changed in the above-described configuration, the disposition of the (coarse-mesh) first-stage filter element 31a and the (fine-mesh) second-stage filter element (trapping filter) 31b is also changed.

(1) In other words, as described hereinabove, when the oil flows in the direction from the hydraulic oil inflow orifice 13g to the hydraulic oil outflow orifice 13h, the filter element 31a with a coarse mesh is disposed as the first-stage filter on the outer side of the filter element 31, and the filter element 31b with a fine mesh is disposed as the second-stage filter (trapping filter) on the inner side of the filter element 31.

(2) Conversely, when the oil flows in the direction such that the opening denoted by the reference symbol 13h in FIG. 3 serves as a hydraulic oil inflow orifice and the opening denoted by the reference symbol 13g in FIG. 3 serves as a hydraulic oil outflow orifice, the filter element 31b with a fine mesh is disposed as the second-stage filter (trapping filter) on the outer side of the filter element 31, and the filter element 31a with a coarse mesh is disposed as the first-stage filter on the inner side of the filter element 31.

In FIG. 3, the differential pressure sensor and the components associated with the differential pressure sensor are not shown.

Figure 4:
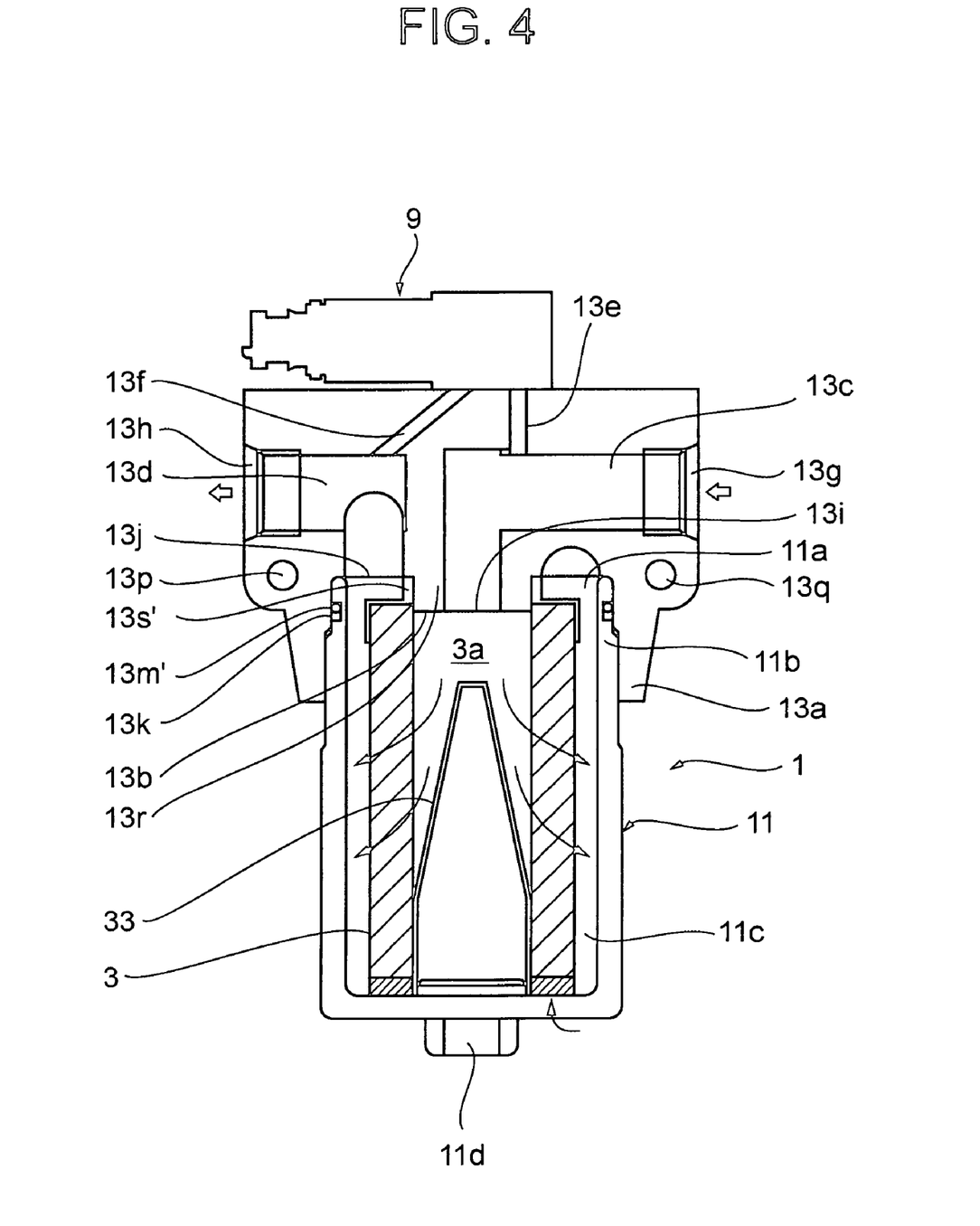
FIG. 4 is an explanatory drawing illustrating the entire cross-sectional structure of the filter for trapping foreign matter of the fourth embodiment of the present invention.

FIG. 4 is an explanatory drawing illustrating the entire cross sectional structure of the filter for trapping foreign matter of the fourth embodiment of the present invention.

The main specific feature of the filter for trapping foreign matter of the present embodiment, is that a fourth flow path guide 33 formed to have a cone-like shape is disposed so that the narrow part thereof faces upward and that the opening at the lower end side thereof is almost entirely sealed, inside the round space portion 3a bounded by the filter element 3. Other constituent features are identical to those illustrated by FIG. 1. Therefore, in FIG. 4, the components identical to those shown in FIG. 1 are assigned with the same reference symbols and the explanation thereof is omitted.

The fourth flow path guide 33 will be further described below. The flow of hydraulic oil that has flown from the opening portion 13i positioned above the housing body 11 into the round space portion 3a of the filter element 3 falls upon the fourth flow path guide 33. As a result, the flow is forcibly guided by the fourth flow path guide 33 toward the filter element 3, and the flow of the hydraulic oil falls upon the filter element 3. As a result, foreign matter admixed to the hydraulic oil also falls together with the hydraulic oil flow upon the filter element and the foreign matter is reliably trapped by the mesh of the filter element 3.

The reference symbols 13m', 13s' in FIG. 4 stand for respective sealing materials. Detailed explanation thereof is herein omitted.

Figure 5:
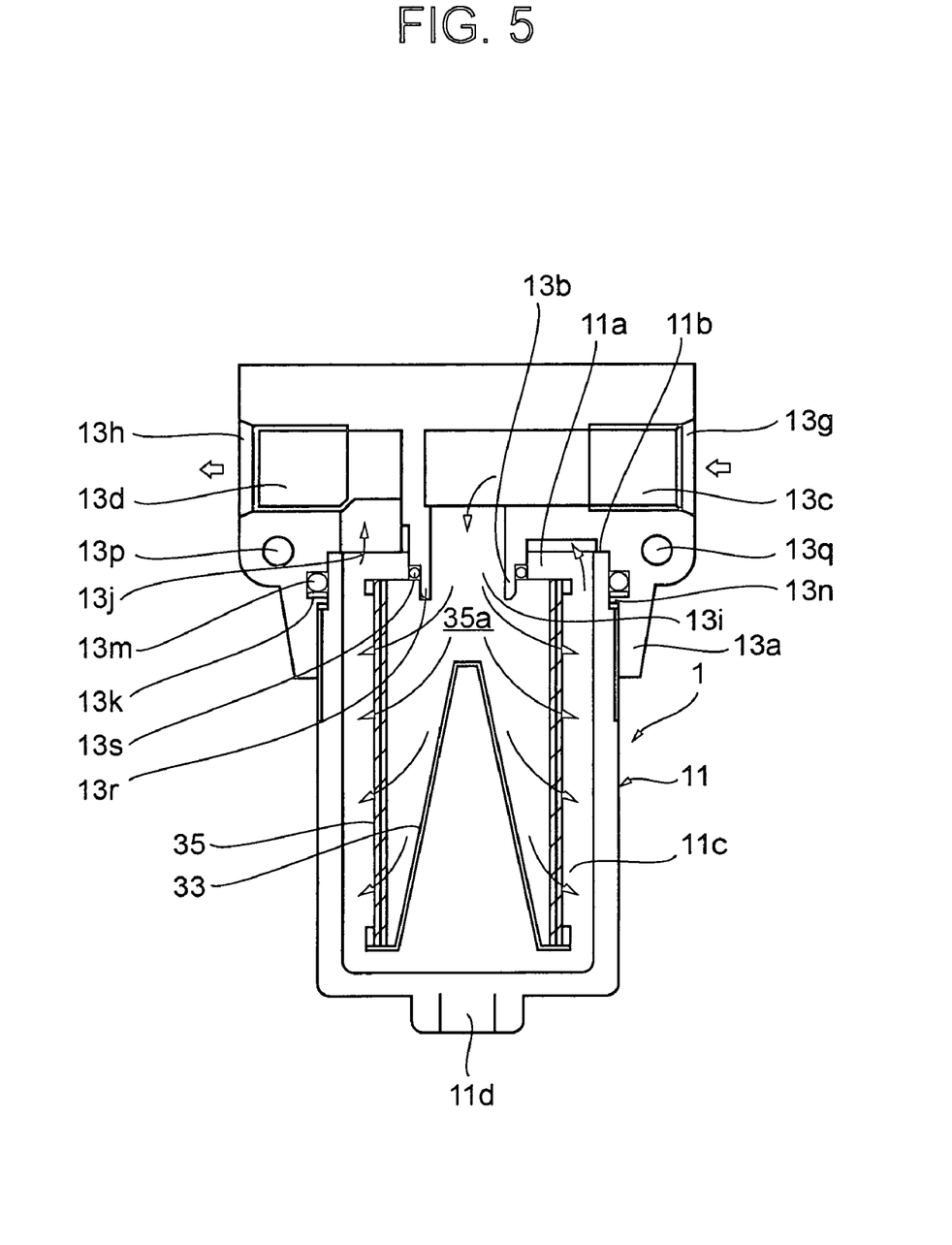
FIG. 5 is an explanatory drawing illustrating the entire cross-sectional structure of the filter for trapping foreign matter of the fifth embodiment of the present invention.

FIG. 5 is an explanatory drawing illustrating the entire cross sectional structure of the filter for trapping foreign matter of the fifth embodiment of the present invention.

The main specific feature of the filter for trapping foreign matter of the present embodiment is that a metallic net for trapping is used in the filter element 35. This filter element 35 also has a round space portion 35a, similarly to the above-described filter elements 3, 27, 31. Other constituent features are identical to those illustrated by FIG. 1 or FIG. 4. Therefore, in FIG. 5, the components identical to those shown in FIG. 1 or FIG. 4 are assigned with the same reference symbols and the explanation thereof is omitted.

In the above-described configuration, a metal mesh for trapping is used as the filter element 35. Therefore, foreign matter can be trapped at a trapping ratio higher than that attained when, for example, a paper element is used as the filter element 35.

The preferred embodiments of the present invention are described above, but they serve only to illustrate the present invention and the scope of the present invention is not limited to those embodiments. The present invention can be implemented in a variety of other modes.

As described hereinabove, the present invention can provide a filter for trapping foreign matter in which a filter element can trap the foreign matter that is admixed to the fluid located inside the filter with good reliability and a comparatively high trapping ratio.

Furthermore, the present invention can provide a filter for trapping foreign matter which can prevent the foreign matter admixed to the fluid present in the filter, which has been trapped by the filter element, from being discharged from the filter element.

Furthermore, the present invention can provide a filter for trapping foreign matter in which trapping foreign matter that is admixed to the fluid located inside the filter with good reliability and a comparatively high trapping ratio makes it possible to detect with good accuracy the amount of the foreign matter by measuring a pressure loss in the filter element.

Furthermore, the present invention can provide a filter for trapping foreign matter in which even if part of foreign matter that has been admixed to the fluid located inside the filter is rejected by the filter element, the rejected foreign matter can be again trapped by the filter element, without accumulating on the bottom of the filter.

Moreover, the present invention can provide a filter for trapping foreign matter in which, of the foreign matter that has been admixed to the fluid located inside the filter, the size of the foreign matter that is the object of trapping with the filter element can be set to the desired size.

What is claimed is:

1. A filter for trapping foreign matter comprising:
an inflow chamber into which a fluid flows;
an outflow chamber from which flows the fluid that has flown into said inflow chamber;
and
a filter element, occupying an annular space surrounding a hollow portion, and having an outer curved surface, end surfaces and an inner curved surface defining the hollow portion, said filter element partitioning said two chambers, wherein
said inflow chamber has a structure arranged substantially the entire length of the inflow chamber and comprising a flow guide being substantially conical with its diameter increasing in the direction of the fluid flow, and extending from the lower end of the inflow chamber to a position near the top of the inflow chamber, such that substantially all the fluid that flows into said inflow chamber is spouted up from a bottom portion of said inflow chamber in a rising flow that is forcibly directed radially by said structure toward said inner curved surface of said filter element along substantially the entire length of said filter element to fall upon and enter the filter element at said inner curved surface.

2. The filter for trapping foreign matter of claim 1, wherein said inflow chamber has an inlet in the upper part thereof and a portion of said structure directs the fluid that has flown in from said inlet toward the lower part of said inflow chamber, directs it toward the bottom portion of said inflow chamber, causes it to rise from the bottom portion, and guides it so that it falls upon the filter element.

3. The filter for trapping foreign matter according to claim 2, wherein the cross section area of a flow path between said portion of said structure and the bottom surface of said inflow chamber is narrowed so as to increase the flow velocity of said fluid.

4. The filter for trapping foreign matter according to claim 1, wherein said inflow chamber has an inlet in the bottom portion thereof and is constructed so that the flow of the fluid that has flown from the inlet into said inflow chamber rises from said bottom portion.

5. The filter for trapping foreign matter according to claim 4, wherein said structure forcibly guides to said filter element the rising flow of the fluid that has flown from the bottom portion of the inlet into said inflow chamber.

6. The filter for trapping foreign matter according to claim 1, wherein said inflow chamber has a streamline shape preventing the stagnation of the fluid.

7. The filter for trapping foreign matter according to claim 1, further comprising a differential pressure sensor for detecting the difference in pressure between said inflow chamber and said outflow chamber.

8. A filter for trapping foreign matter comprising:
an inflow chamber into which a fluid flows;
an outflow chamber from which flows the fluid that has flown into said inflow chamber;
a filter element, occupying an annular space surrounding a hollow portion, and having an outer curved surface, end surfaces and an inner curved surface defining the hollow portion, said filter element partitioning said two chambers, and
a guide, held inside said inflow chamber and substantially the entire length of the inflow chamber, said flow guide being substantially conical with it's diameter increasing in the direction of fluid flow and extending from the lower end of the inflow chamber to a position near the top of the inflow chamber, for forcibly guiding the flow of substantially all the fluid that has flown into said inflow chamber radially toward said inner curved surface of said filter element along substantially the entire length of said filter element to fall upon and enter the filter element at said inner curved surface, wherein flow of the fluid is directed along an outer surface of said guide.

9. The filter for trapping foreign matter according to claim 8, further comprising a differential pressure sensor for detecting the difference in pressure between said inflow chamber and said outflow chamber.

* * * * *